US009239660B2

(12) United States Patent (10) Patent No.: US 9,239,660 B2
Pineda et al. (45) Date of Patent: *Jan. 19, 2016

(54) NATURAL LANGUAGE INTERFACE CUSTOMIZATION

(71) Applicant: AT&T INTELLECTUAL PROPERTY I, L.P., Atlanta, GA (US)

(72) Inventors: George Dante M. Pineda, Elburn, IL (US); David Findley, St Peters, MO (US); Amy Hicks, Belleville, IL (US); Youngmei Jia, Chicago, IL (US); Stephen Dulaney, Austin, TX (US); George W Krauss, Carpentersville, IL (US); Laura R Pszczolkowski, Wayne, IL (US); David L Howell, Plainfield, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 400 days.

This patent is subject to a terminal disclaimer.

(21) Appl. No.: 13/796,819

(22) Filed: Mar. 12, 2013

(65) Prior Publication Data

US 2013/0263010 A1    Oct. 3, 2013

Related U.S. Application Data

(63) Continuation of application No. 11/761,492, filed on Jun. 12, 2007, now Pat. No. 8,417,509.

(51) Int. Cl.
    *G06F 17/20* (2006.01)
    *G06F 3/0481* (2013.01)
    *G06F 17/27* (2006.01)

(52) U.S. Cl.
    CPC .............. *G06F 3/0481* (2013.01); *G06F 17/27* (2013.01)

(58) Field of Classification Search
    CPC ................... G06F 17/30864; G06F 17/30253; G06K 9/4685
    USPC ............ 704/10, 275, 277, 8, 9; 715/781, 779, 715/747; 709/224, 202, 206, 219, 223; 379/88.01; 455/432.1, 456.1, 553.1; 713/182
    See application file for complete search history.

(56) References Cited

U.S. PATENT DOCUMENTS

| 6,091,411 | A  | * | 7/2000  | Straub et al. ................... 715/747 |
| 6,201,963 | B1 | * | 3/2001  | Nakamura ................. 455/432.1 |
| 6,292,772 | B1 | * | 9/2001  | Kantrowitz ....................... 704/9 |
| 6,466,654 | B1 | * | 10/2002 | Cooper et al. ............. 379/88.01 |
| 7,644,072 | B2 | * | 1/2010  | Budzik et al. ................. 707/748 |
| 2002/0095466 | A1 | * | 7/2002 | Ushigusa ...................... 709/206 |

(Continued)

*Primary Examiner* — Michael Colucci (74) *Attorney, Agent, or Firm* — Greenblum & Bernstein, P.L.C.

(57) ABSTRACT

A method for communicating over a network includes transmitting, by an application server to a remote user computing device, a predefined interface in response to a contact request by the remote user, the predefined interface being customized by the application server based on specified conditions. The method also includes analyzing, by an analysis server in communication with the application server by a communication link different from the network, a natural language inquiry from the remote user based on the type of remote user language of the contact request. The method further includes transmitting, by the application server to the remote user computing device, a customized interface, which includes a customized plurality of communications options for the remote user to route subsequent communications, and customized content based on a context of the natural language inquiry.

20 Claims, 6 Drawing Sheets

(56) References Cited

U.S. PATENT DOCUMENTS

| | | | |
|---|---|---|---|
| 2002/0116172 A1* | 8/2002 | Vargas | 704/8 |
| 2003/0046364 A1* | 3/2003 | Sisco et al. | 709/219 |
| 2003/0083075 A1* | 5/2003 | Miyazaki et al. | 455/456 |
| 2003/0144846 A1* | 7/2003 | Denenberg et al. | 704/277 |
| 2003/0187641 A1 | 10/2003 | Moore et al. | |
| 2005/0091506 A1* | 4/2005 | Miller et al. | 713/182 |
| 2005/0193055 A1* | 9/2005 | Angel et al. | 709/202 |
| 2005/0268247 A1* | 12/2005 | Baneth | 715/781 |
| 2006/0036966 A1* | 2/2006 | Yevdayev | 715/779 |
| 2006/0242202 A1* | 10/2006 | Li | 707/104.1 |
| 2007/0100981 A1* | 5/2007 | Adamczyk et al. | 709/223 |
| 2008/0104227 A1* | 5/2008 | Birnie et al. | 709/224 |
| 2009/0098906 A1* | 4/2009 | Benner et al. | 455/553.1 |

* cited by examiner

NATURAL LANGUAGE INTERFACE CUSTOMIZATION

CROSS REFERENCE TO RELATED APPLICATION

This application is a continuation of Pending U.S. patent application Ser. No. 11/761,492, filed Jun. 12, 2007, the contents of which are expressly incorporated herein by reference in their entireties.

BACKGROUND OF THE DISCLOSURE

1. Field of the Disclosure

The present disclosure relates to customizing interfaces based on analysis of natural language inquiries and statements. More particularly, the present disclosure relates to customizing user interfaces based on analyzing natural language inquiries and statements input by users via predetermined interfaces.

2. Background Information

Large organizations often are required to process large volumes of incoming communications, many of which are emails generated by visitors to a website provided by the organization. Optimizing processing for such communications can impact both costs and visitor satisfaction. Accordingly, agents that process incoming communications are often divided into specialized agent groups in order to efficiently handle large volumes of incoming communications.

Typically, a website Contact Us page maintains contact information. Listing contact information on a website tends to present several problems, including visitor confusion, routing inaccuracy and unnecessary handling time. That is, a visitor may not properly perceive which agent group handles an issue based merely upon viewing listed contact information. Additionally, when an incoming communication is sent to the wrong agent group, the incoming communication needs to be redirected to the appropriate agent group for processing. Finally, improperly addressed incoming communications may be unnecessarily processed initially by the wrong agent group before being subsequently processed by the right agent group following transfer.

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout several views of the drawing, and in which.

DETAILED DESCRIPTION

In view of the foregoing, the present disclosure, through one or more of its various aspects, embodiments and/or specific features or sub-components, is thus intended to bring out one or more of the advantages as specifically noted below.

According to an aspect of the present disclosure, a method of interacting with a remote user includes presenting a predefined interface to the remote user. The method also includes receiving a natural language inquiry from the remote user via the predefined interface. The natural language inquiry is configured for use in an analysis. The method further includes presenting a customized interface to the remote user based on the analysis of the natural language inquiry. The customized interface includes a customized set of communications options for the remote user to route communications.

According to another aspect of the present disclosure, the predefined interface includes a webpage.

According to still another aspect of the present disclosure, the remote user is presented the predefined interface over the internet.

According to yet another aspect of the present disclosure, the predefined interface includes an inquiry interface for the remote user to input the natural language inquiry.

According to another aspect of the present disclosure, the customized interface includes a standardized template.

According to still another aspect of the present disclosure, the customized interface includes customized content that is customized based on the context of the natural language inquiry.

According to yet another aspect of the present disclosure, the customized set of communications options includes a set of email addresses.

According to another aspect of the present disclosure, the customized set of communications options are presented in association with context-sensitive information.

According to still another aspect of the present disclosure, the customized set of communications options includes a set of telephony addresses.

According to yet another aspect of the present disclosure, the customized set of communications options include an expandable tree menu.

According to another aspect of the present disclosure, the customized interface further includes a customized set of predefined inquiries.

According to still another aspect of the present disclosure, the customized set of predefined inquiries includes an expandable tree menu.

According to yet another aspect of the present disclosure, the customized set of predefined inquiries are linked to at least one second predefined interface corresponding to predefined answers to the predefined inquiries.

According to another aspect of the present disclosure, the customized interface further includes at least one link to at least one resource.

According to still another aspect of the present disclosure, the customized interface further includes at least one link to at least one second predefined interface corresponding to predefined information.

According to yet another aspect of the present disclosure, the at least one link to the at least one second predefined interface is presented via the customized interface in association with context-sensitive information.

According to another aspect of the present disclosure, the at least one link to the at least one second predefined interface is changed based on the remote user selecting one of the customized set of communications options.

According to still another aspect of the present disclosure, the customized set of predefined inquiries are changed based on the remote user selecting one of the customized set of communications options.

According to an aspect of the present disclosure, at least one computer readable medium stores a computer program that interacts with a remote user. The at least one computer readable medium includes a predefined interface presenting code segment that presents a predefined interface to the remote user. The at least one computer readable medium also includes a natural language inquiry receiving code segment that receives a natural language inquiry from the remote user via the predefined interface. The natural language inquiry is configured for use in an analysis. The at least one computer readable medium further includes a customized interface presenting code segment that presents a customized interface to the remote user based on the analysis of the natural language inquiry. The customized interface includes a customized set of communications options for the remote user to route communications.

According to an aspect of the present disclosure, a system for interacting with a remote user includes a presenter configured to present a predefined interface to the remote user. The system also includes a receiver configured to receive a natural language inquiry from the remote user via the predefined interface. The natural language inquiry is configured for use in an analysis. The presenter is configured to present a customized interface to the remote user based on the analysis of the natural language inquiry. The customized interface includes a customized set of communications options for the remote user to route communication.

Figure 1:
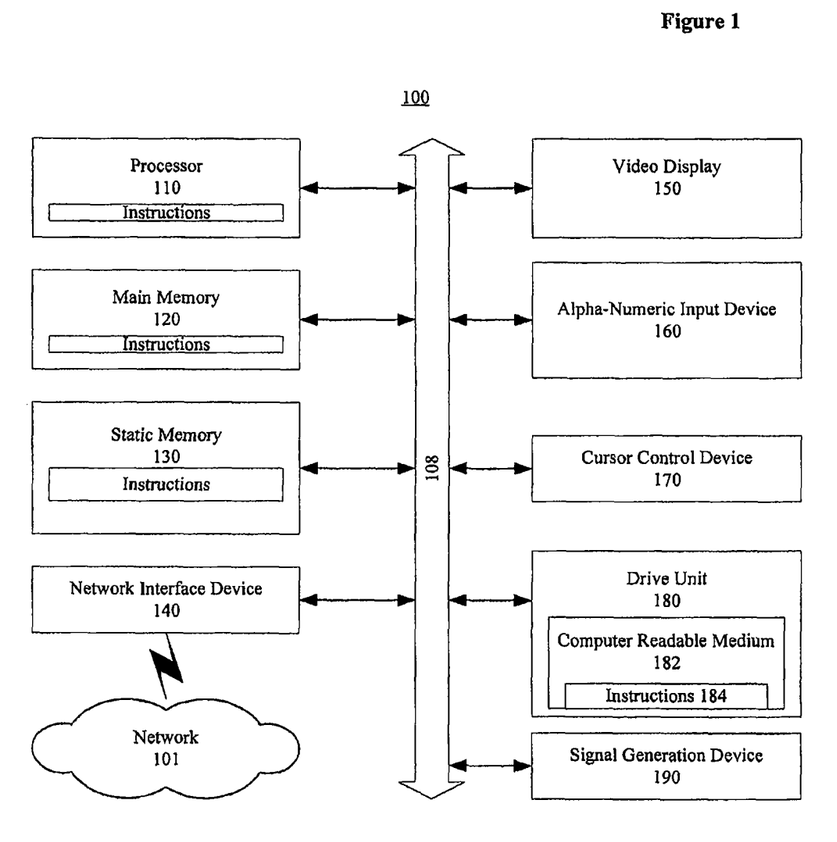
FIG. 1 shows an exemplary general computer system that includes a set of instructions for performing natural language interface customization.

Referring to FIG. 1, an illustrative embodiment of a general computer system, on which a method for natural language interface customization can be implemented, is shown and is designated 100. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

According to an aspect of the present disclosure, natural language interface customization can be used to both reduce incoming communication volume and improve routing accuracy for incoming communications received by an organization. As disclosed herein, the volume of incoming communications can be reduced by providing users with alternatives (i.e., to sending communications) based on user point-and-click interaction with user interfaces. The volume of incoming communications can also be reduced by providing users with alternatives (i.e., to sending communications) based on analysis of natural language inquiries from the users. Where the alternatives are provided by customizing interfaces to present the alternatives to the users, the customized interfaces can also be used to enhance routing accuracy for those users who still wish to forward communications for processing, by providing targeted communications options in association with context sensitive information that describes each targeted communications option. Finally, routing accuracy for natural language communications from the users can also be improved based on analysis of the natural language communications from the users.

An organization provides a webpage on the internet. The process of natural language interface customization begins by prompting visitors to provide a natural language inquiry or declarative statement indicating the information sought by the visitor. The visitor responds to the prompt by providing a natural language inquiry or declarative statement in a designated window on the webpage. When a user sends a natural language inquiry or declarative statement, the content of the inquiry or declarative statement can be scanned and analyzed according to an algorithmic analysis. Application of a natural language engine to analyze the scanned natural language inquiries and declarative statements results in a determination of which contact options, FAQs and web support links will likely lead the visitor to the information sought. The natural language engine applies the algorithmic analysis to determine the underlying meaning of the natural language inquiry or declarative statement. For example, a limited and specific list of contact options, predefined inquiries (FAQs) and web support tools may be generated based on the analysis. The predefined inquiries (FAQs), web support tools and any other alternative self help tools are generated to help a visitor handle the issue without involving an agent. The visitor is thereby presented with context sensitive information that describes contact options and self help tools relevant to the natural language inquiry or declarative statement.

The contact options may be presented as a variety of communication modes, including internet/email, phone and voice or video conferencing. Predefined inquiries (FAQs) or web support tools may be presented as links to separate parts of the website, as links that result in pop-up windows, or as links that result in reconfiguration of the immediate webpage, the pressing of any of which will result in the predefined inquiries (FAQs) or web support tools being presented as information for the visitor.

Additionally, at any time during a visit to a website, pointing and clicking any of the contact options, predefined inquiries (FAQs) or web support tools may result in reconfiguration of the immediate webpage, to present a set of contact options, predefined inquiries (FAQs) and/or web support tools most relevant to the contact choice, predefined inquiries (FAQs) or web support tools selected by pointing and clicking. Application of predetermined rules may result in the reconfiguration to group specific contact options, predefined inquiries (FAQs) or web support tools together as related. Thus, even when a user is first presented with a basic predefined webpage interface with the most common (but varied) contact options, predefined inquiries (FAQs) or web support tools, selection of even any of these common contact options, predefined inquiries (FAQs) or web support tools may result in reconfiguration of the webpage to present an entire set of contact options, predefined inquiries (FAQs) and web support tools related to the selected contact choice, predefined inquiry (FAQ) or web support tool.

Using a general computer system as shown in FIG. 1, a user is provided with natural language interface customization. The user accesses a webpage and is presented with a window that prompts the user to enter a natural language inquiry or declarative statement. A first natural language interface customization processor scans the text of the natural language inquiry or declarative statement and identifies keywords and/or phrases. Either the first natural language interface customization processor or a second natural language interface customization processor performs an algorithmic analysis of the identified keywords and/or phrases to determine the underlying meaning of the natural language inquiry or declarative statement. A probabilistic likelihood of the natural language inquiry or declarative statement being related to predetermined topics is determined by either the first natural language interface customization processor or the second natural language interface customization processor. Contact choices, predefined inquiries (FAQs) and web support tools for the most likely topics are then presented to the user via a reconfigured webpage.

Figure 2:
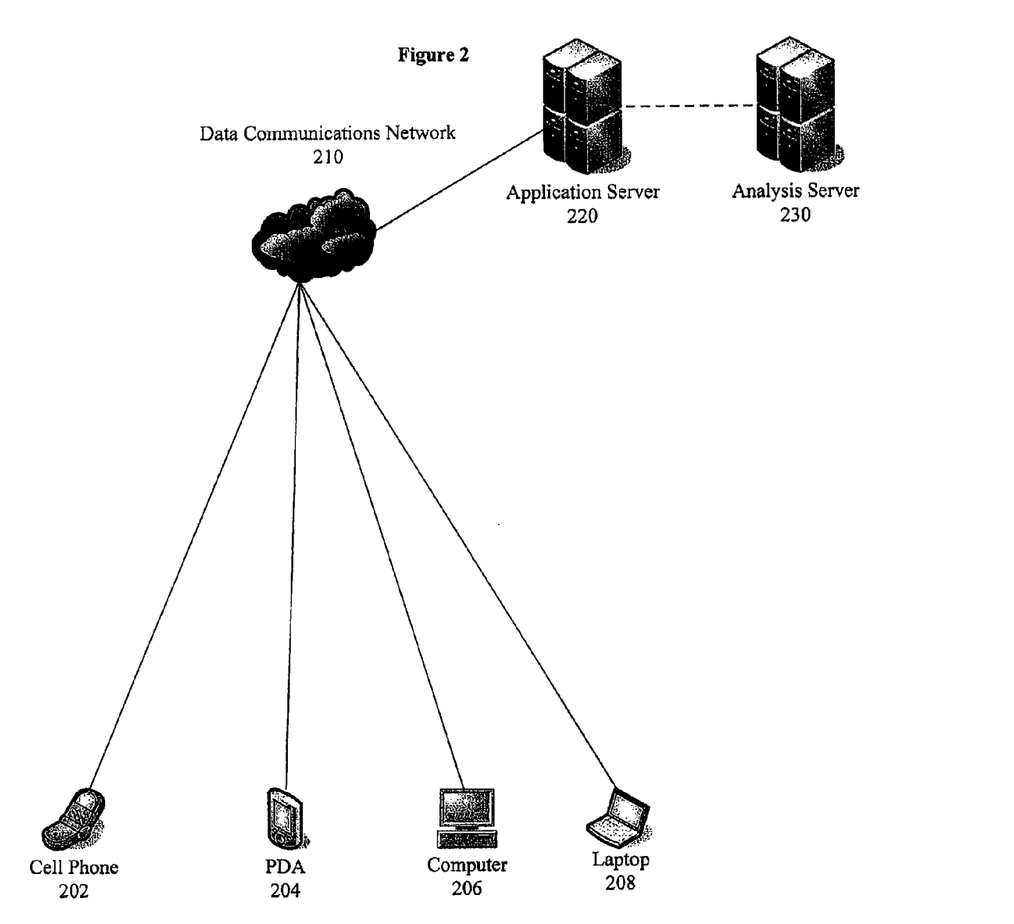
FIG. 2 shows an exemplary communications network for natural language interface customization.

In FIG. 2, an exemplary communications networks for natural language interface customization includes an application server 220 which provides data to communications devices over a data communications network 210. The exemplary communications devices shown in FIG. 2 include a cell phone 202, a personal digital assistant (PDA) 204, a desktop/personal computer 206, and a laptop computer 208. The application server 220 also communicates with an analysis server 230, such as when the application server 220 provides the text scanning and the analysis server 230 provides the algorithmic analysis to determine natural language interface customization.

The application server 220 includes a first presentation module configured to present a predefined webpage interface to the remote user. The application server 220 also includes a receiver configured to receive a natural language inquiry from the remote user via the predefined webpage interface. The natural language inquiry is configured for use in the text scanning by the application server 220 and the algorithmic analysis by the analysis server 230. The application server 220 also includes a second presentation module configured to present a customized interface to the remote user based on the analysis. The customized interface provided by the second presentation module includes a customized set of communications options for the remote user to route communications, a customized set of predefined inquiries (FAQs) and a customized set of web support tools.

Figure 3:
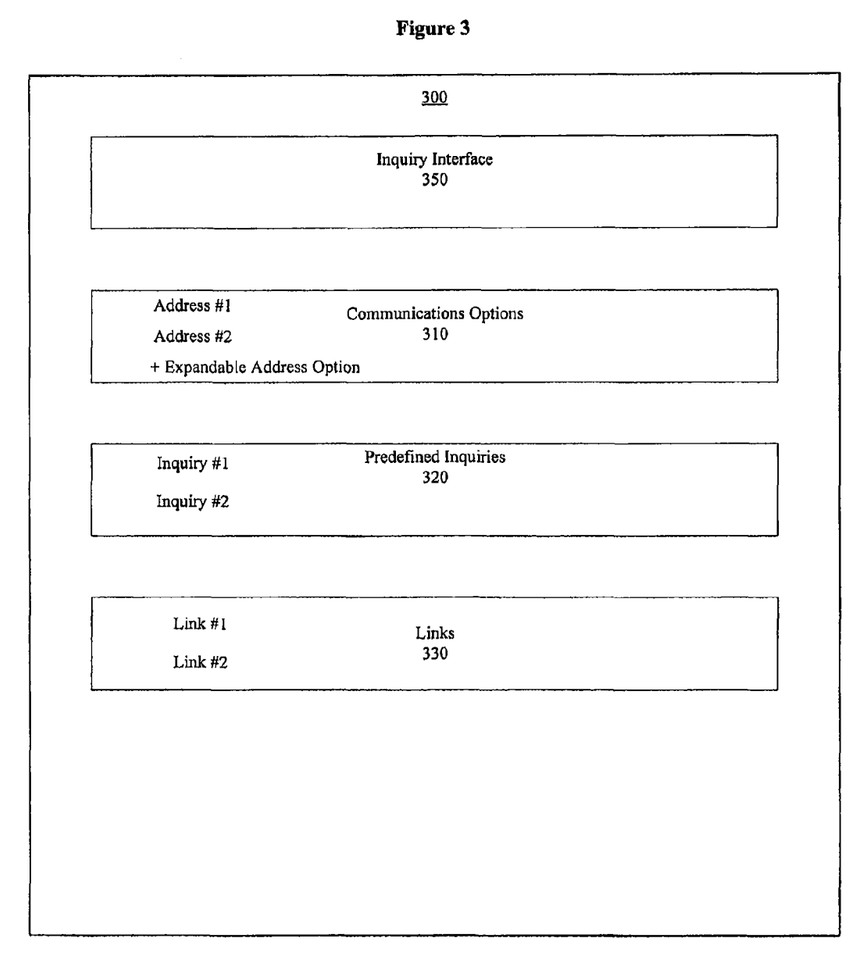
FIG. 3 shows an exemplary first webpage interface for natural language interface customization.

FIG. 3 shows an exemplary predefined first interface 300 for natural language interface customization. As shown, the exemplary predefined first interface 300 includes an inquiry interface 350 by which a user is prompted to enter a natural language inquiry or declarative statement. The exemplary predefined first interface 300 also includes a communications options area 310, which presents two initial set address options and an initial expandable address option in association with context sensitive information. A predefined inquiries area 320 includes two initial predefined inquiries in association with context sensitive information. A links area 330 presents two initial links in association with context sensitive information.

The predefined first interface 300 is generated by, e.g., the application server 220 shown in FIG. 2, and forwarded to a user communications device over the data communications network 210. The predefined first interface 300 is generated by a predefined interface presenting code segment processed by the application server 220. When the user inputs a natural language inquiry or declarative statement via the predefined first interface 300, a natural language inquiry receiving code segment processed by the application server 220 receives the natural language inquiry.

Figure 4:
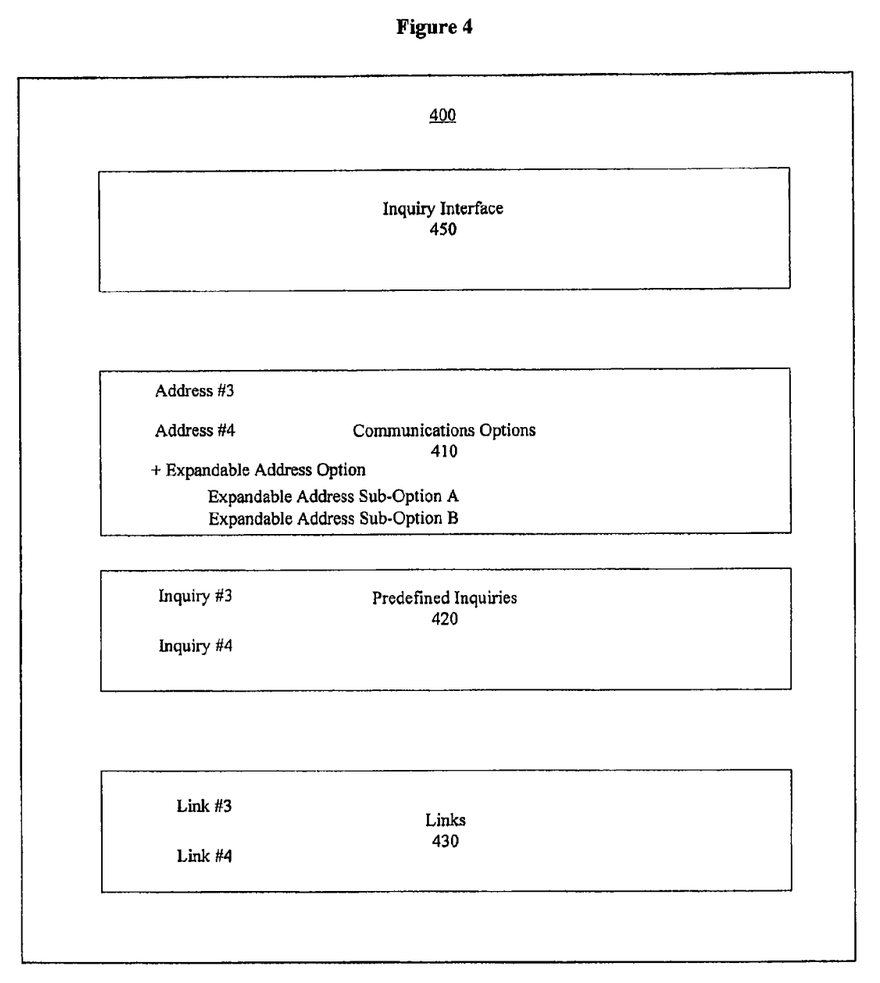
FIG. 4 shows an exemplary second webpage interface for natural language interface customization.

FIG. 4 shows an exemplary customized second interface 400 for natural language interface customization. As shown, the exemplary customized second interface 400 includes an inquiry interface 450 by which a user may be prompted to enter a natural language inquiry or declarative statement or which may show the natural language inquiry or declarative statement entered into the inquiry interface 350 of the predefined first interface 300. The exemplary customized second interface 400 also includes a communications options area 410.

The communications options area 410 shows the expansion of the expandable address option presented in the communications options area 310 shown in FIG. 3. That is, in the embodiment of FIG. 4, the customized second interface 400 is generated based upon the user's pointing and clicking the expandable address option in the communications options area 310. As explained above, at any time during a visit to a website, pointing and clicking any of the contact options, predefined inquiries (FAQs) or web support tools may result in reconfiguration of the immediate webpage, to present a set of contact options, predefined inquiries (FAQs) and/or web support tools most relevant to the contact choice, predefined inquiries (FAQs) or web support tools selected by pointing and clicking. Thus, even when the user is first presented with the predefined first interface 300, selection of even a common expandable address option as would be shown in the predefined first interface 300 results in reconfiguration of the webpage to present a customized set of contact options, predefined inquiries (FAQs) and web support tools related to the selected expandable address option.

The communications options area 410 shows third and fourth address options which are different from the two initial address options shown in FIG. 3. The third and fourth address options are those address options which are not sub-options of the expandable address option, but which are predetermined to relate most closely to the expandable address option and which are therefore presented when the user selects the expandable address option in FIG. 3. A predefined inquiries area 420 includes third and fourth predefined inquiries, each of which is presented as a result of the user selecting the expandable address option shown in the communications options area 310. Finally, a links area 430 presents third and fourth links, each of which is presented as a result of the user selecting the expandable address option in FIG. 3.

The customized second interface 400 is generated by, e.g., the application server 220, and forwarded to a user communications device over the data communications network 210.

The customized second interface 400 is generated by a customized interface presenting code segment processed by the application server 220.

Finally, although the customized second interface 400 explained above is generated and presented based on the user pointing and clicking the expandable address option in FIG. 3, a customized second interface 400 will also be generated based on analysis of natural language inquiries from the users as explained below.

Figure 5:
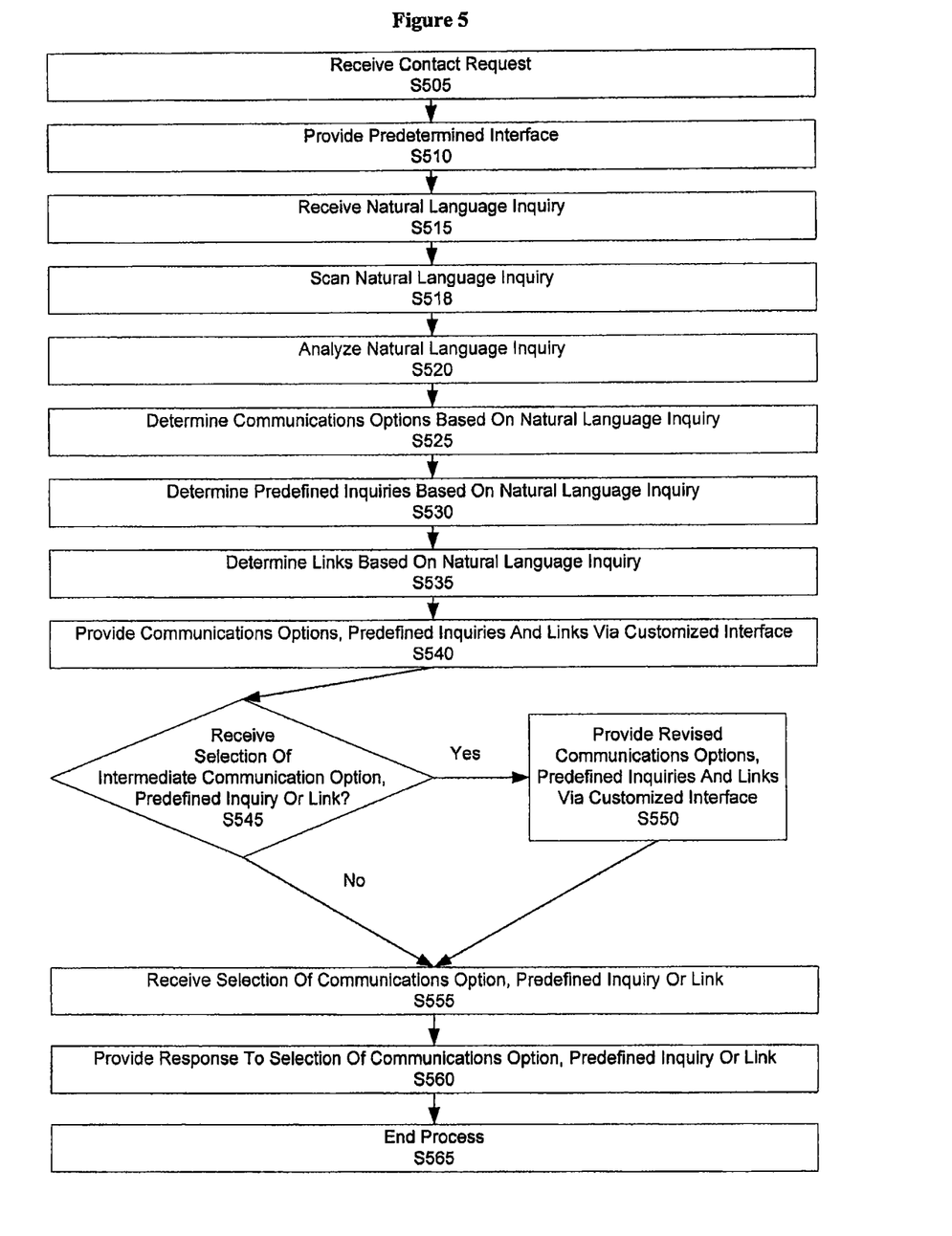
FIG. 5 shows an exemplary method for performing natural language interface customization.

FIG. 5 shows an exemplary method of natural language interface customization. As shown, a contact request is received at S505. The contact request may be received when, for example, a user types the name of an internet site into a browser and a application server 220 is contacted. A predefined interface is provided at S510. The predefined interface may be, for example, a main webpage that is returned to the user upon receipt of the contact request. The predefined interface may also be, for example, a secondary "Contact Us" webpage accessible from the main page. The exemplary webpage shown in FIG. 3 is an example of a predefined interface. In the example where the predefined interface is a webpage, the webpage need not be the same for every user anywhere in the world at any time. Rather, a predefined interface may vary, for example, based upon a language or location of the device used by the user requesting contact or by the time of day or day of week at which the contact request is received. However, even where different users are provided webpage variations based upon language, location or time, the predefined interface may be based on a standardized webpage template. Thus, the predefined interface is provided to a remote user, and in the example of a webpage the predefined interface is provided to a remote user over the internet.

In the example of a webpage, the predefined webpage interface includes an inquiry window for the remote user to input the natural language inquiry. A natural language inquiry is received at S515 via the predefined interface. The natural language inquiry is initially received by the application server 220 that provides the predefined interface. For example, the natural language inquiry may be an inquiry or declarative statement input by a user in response to a prompt on a "Contact Us" page accessible from the initial main page.

The natural language inquiry is scanned at S518 and analyzed at S520. In the example of text input by the user in response to a prompt, text scanning at S518 begins by compiling the input text in the order input by the user, and then parsing the compiled text for individual keywords and patterns of keywords. In the analysis at S520, individual keywords and patterns of keywords are then matched by an algorithmic model to probable topics according to likelihood. At S525, communications options are determined, at S530, predefined inquiries (FAQs) are determined, and at S535, additional web support options are determined. Although the matching of individual keywords and patterns of keywords to probable topics is performed separately for communications options, predefined inquiries (FAQs), and web support in the example shown in FIG. 5, such matching can be performed together by pre-matching predetermined topics to predetermined communications options, predefined inquiries (FAQs) and web support, and then deriving the communications options, predefined inquiries (FAQs) and web support based on determining the most likely topic.

At S540, a customized interface is provided with a set of the determined communications options, predefined inquiries (FAQs) and links to web support. The customized interface may appear as an entirely new interface, or may appear as an update of the original predefined interface, as shown in FIG.

4, with the original communications options, predefined inquiries (FAQs) and links to web support replaced or revised with the determined communications options, predefined inquiries (FAQs) and links to web support. The customized set of communications options are presented in association with context-sensitive information. That is, each of the communications options may be presented in association with information such as a department or topic that may relate to the natural language inquiry provided by the user. Examples of such context-sensitive information include "complaints", "new service", "cancelling service" or any number of other context-sensitive topics that may relate to information sought by a visitor.

Thus, a customized interface is presented to the remote user based on the analysis of the natural language inquiry. The customized interface includes a customized set of communications options for the remote user to route communications. Whether only one, or more than one, of customized communications options, predefined inquiries or links to web support are provided, such customized communications options, predefined inquiries and/or links is content that is customized based on the analysis of the context of the natural language inquiry.

The customized set of communications options may include at least a set of email addresses and/or a customized set of telephony addresses. The customized set of communications options may include an expandable tree menu in association with context-sensitive information that describes common inquiries. For example, a label "billing" may be initially presented in association with an expandable menu of sub-labels for different communications options for different topics. When the user selects "billing", the customized webpage interface may be revised to shown the various addresses associated with different billing departments. For example, for a telecommunications service provider, the addresses of the expandable menu under "billing" may include "cable" and "telephone".

As explained above, the customized interface may also include a customized set of predefined inquiries (FAQs). The customized set of predefined inquiries (FAQs) may also include an expandable tree menu in association with context-sensitive information that describes common inquiries. Additionally, the customized set of predefined inquiries may be linked to one or more pop-up windows or different sections of the website with content of defined answers to the predefined inquiries. Alternatively, selection of a predefined inquiry may result in a revision of at least part of the original customized interface to present predefined answers to the predefined inquiries.

The customized interface may further include at least one link. The links may be presented via the customized interface in association with context-sensitive information, and selection of the link may result in presentation of a resource associated with the context-sensitive information such as a different section of the website which presents predetermined information associated with the context-sensitive information associated with the selected link. That is, the customized interface may further include at least one link to at least one second predefined interface corresponding to predefined information.

At S545, a determination is made whether the user has selected an intermediate communication option, predefined inquiry or link, such as by selecting the expandable address option in the communications options area 310. If the user has selected an intermediate communications option, predefined inquiry or link at S545 (S545=Yes), revised communications options, predefined inquiries and links are provided at S550.

Such revised communications options, predefined inquiries and links may be provided by associating communications options, predefined inquiries and links as a predetermined family of related options which should be presented together when a member of the family is selected by the user. Thus, if the user has selected an intermediate communications option, predefined inquiry or link at S545 (S545=Yes), the customized interface is revised and presented to the remote user. That is, based on selection of an intermediate communications option, link(s) to web support on second predefined interface (s) and links to predefined inquiries (FAQs) may be changed.

After providing the revised communications options, predefined inquiries and links via the initial customized interface at S550, or if the user does not select an intermediate communications option, predefined inquiry or link at S545 (S545=No), a selected communications option, predefined inquiry or link is received at S555. At S560, the response to the selected communications option, predefined inquiry (FAQ) or link is provided at S560 and the process ends at S565. If the user has selected an email communications option, the response at S560 may be to present an email form with a predetermined destination email address provided in accordance with the selection. If the user has selected a telephone communications option, a screen with the number to call (with a link to the number if voice over internet protocol (VoIP) is available) may be provided. If the user has selected a predefined inquiry (FAQ) option, a screen with predetermined questions and answers may be provided at S560. Finally, if a link option is selected, a new webpage may be provided with information related to the context sensitive topic associated with the selected link.

Figure 6:
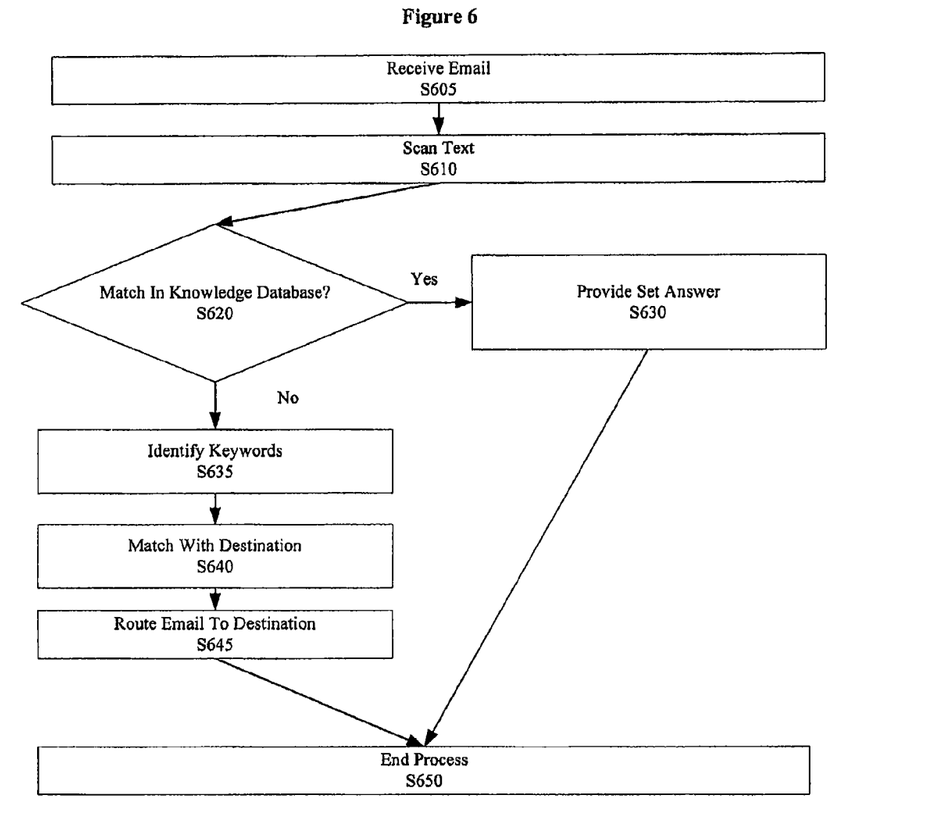
FIG. 6 shows an exemplary method for performing natural language interface customization.

FIG. 6 is another method of natural language interface customization. The exemplary method shown in FIG. 6 is applicable when a user has selected an email communications option, and an email form with a predetermined destination email address is provided to the user. At S605, an email is received from the user. At S610, the text of the email is scanned. At S620, it is determined whether the email matches a previous email in a knowledge database. That is, at S620, a determination is made whether the email is identical or substantially identical to one or more previous emails which have been properly answered for other users. If the email matches a previous email in a knowledge database at S620 (S620=Yes), the set answer from the knowledge database is provided to the user in an email response, and the process ends at S650.

However, if the email does not match a previous email in the knowledge database at S620 (S620=No), the email will be routed to an agent for handling. Accordingly, at S635, keywords in the email are identified and at S640 the identified keywords are matched with a particular topic associated with a particular destination address which corresponds to an agent or agent group identified as most appropriate to handle emails for the topic. At S645 the email is routed to the destination address for the agent or agent group, and the process ends at S650.

As described above, customized interfaces may be presented in response to analysis of natural language inquiries, as well as in response to user point-and-click interaction with user interfaces. Further, emails may be routed in response to analysis of natural language inquiries. The customization of interfaces may result in fewer emails being sent to agents, insofar as the predefined inquiries (FAQs) and links to webpage support may provide users with information that would otherwise be provided by an agent. Further, the customization of interfaces and the subsequent routing of emails may result in improved accuracy and less processing.

An example of natural language interface customization begins with a user typing an address into a browser window and then clicking on the context sensitive label "contact us" which appears on the main page. The resultant predefined webpage interface may be labeled "Tell Us Your Subject", and specific instructions may be provided such as "Please provide a brief description of what you would like to contact us about and we will display your options for contacting us". A user may be prompted to enter a natural language inquiry up to 75 characters/spaces, and one or more examples may even be provided.

If the user enters an inquiry such as "How do I change the contact information for my account?", the user may be presented with a customized webpage interface. The customized webpage interface may include a section entitled "Email Us" with instructions to "Email Us About One of These Subjects", and context-sensitive information presented in association with a hyperlink to an email form with different destination addresses automatically filled in for different topics. The customized webpage interface may also include a section entitled "Help Yourself", and context-sensitive information presented in association with tabs that, when clicked, result in the customized interface being updated with a window with a predetermined question/answer pair provided. Finally, the customized webpage interface may include a section entitled "Web Support", and context-sensitive information presented in association with links that, when pressed, result in a new preconfigured webpage being presented which presents information associated with the selected context-sensitive information. Further, in any of the sections on such a webpage, expandable options may be presented in association with context-sensitive information, and selection of an expandable option may result not only in presentation of the expanded sub-options, but also in revision of the information presented in other areas of the customized webpage interface. Finally, if an email option is ultimately selected, even the email itself can be analyzed to ensure routing to a most appropriate agent based on natural language analysis.

Accordingly, by customizing a webpage interface based on natural language inquiry analysis as described above, an organization may reduce the number of incoming emails and the number of misdirected emails. Accordingly, incoming visitor communications can be reduced by highlighting context specific predefined inquiries (FAQs) and web support tools as an alternative to communications. Additionally, natural language interface customization improves routing accuracy for communications still sent by visitors because natural language interface customization as the customization of interfaces presents contact information to a user based on information actually entered by the user, and because communications may be analyzed and routed even after they are sent by the user.

Of course, the present disclosure is not limited to the examples and embodiments shown herein. For example, the present disclosure is not limited to webpages, emails, contact options, predefined inquiries (FAQs), web support, or any of the other examples shown herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

We claim:

1. A method for communicating over a network, the method comprising:
   transmitting, by an application server to a remote user computing device, a predefined interface in response to a contact request by the remote user, wherein the predefined interface is presented to the remote user, by displaying the predefined interface on the remote user computing device, the predefined interface being customized by the application server based on specified conditions including a location of the remote user computing device, a time of day, a day of a week, and a type of remote user language in which the contact request is received by the application server;

analyzing, by an analysis server in communication with the application server by a communication link different from the network, a natural language inquiry from the remote user based on the type of remote user language of the contact request;

transmitting, by the application server to the remote user computing device, a customized interface;

wherein the customized interface is presented to the remote user, the customized interface including a customized plurality of communications options for the remote user to route subsequent communications, wherein the customized interface comprises customized content that is customized based on a context of the natural language inquiry, and wherein a customized plurality of predefined inquiries is changed based on the remote user selecting a customized communications option.

2. The method according to claim 1, wherein the predefined interface comprises a webpage.

3. The method according to claim 1, wherein the remote user is presented the predefined interface over the Internet.

4. The method according to claim 1, wherein the predefined interface includes an inquiry interface for the remote user to input the natural language inquiry.

5. The method according to claim 1, wherein the customized interface comprises a standardized template.

6. The method according to claim 1, wherein the analyzing the natural language inquiry includes matching individual keywords and patterns of keywords by an algorithmic model to probable topics according to likelihood.

7. The method according to claim 1, wherein the customized plurality of communications options includes a plurality of email addresses.

8. The method according to claim 1, wherein the customized plurality of communications options is presented in association with context-sensitive information.

9. The method according to claim 1, wherein the customized plurality of communications options includes a plurality of telephony addresses.

10. The method according to claim 1, wherein the customized plurality of communications options includes an expandable tree menu.

11. The method according to claim 1, wherein the customized interface further includes a customized plurality of predefined inquiries.

12. The method according to claim 11, wherein the customized plurality of predefined inquiries includes an expandable tree menu.

13. The method according to claim 11, wherein the customized plurality of predefined inquiries is linked to a second predefined interface corresponding to predefined answers to the predefined inquiries.

14. The method according to claim 1, wherein the customized interface further includes a link to a second predefined interface corresponding to predefined information.

15. The method according to claim 14, wherein the link to the second predefined interface is presented via the customized interface in association with context-sensitive information.

16. The method according to claim 14, wherein the link to the second predefined interface is changed based on the remote user selecting a customized communications option.

17. A tangible non-transitory computer-readable storage medium encoded with an executable program for communication over a network and that, when executed by a processor, causes the processor to perform operations comprising:

transmitting, by an application server to a remote user computing device, a predefined interface in response to a contact request by the remote user, wherein the predefined interface is presented to the remote user, by displaying the predefined interface on the remote user computing device, the predefined interface being customized by the application server based on specified conditions including a location of the remote user computing device, a time of day, a day of a week, and a type of remote user language in which the contact request is received by the application server;

analyzing, by an analysis server in communication with the application server by a communication link different from the network, a natural language inquiry from the remote user based on the type of remote user language of the contact request;

transmitting, by the application server to the remote user computing device, a customized interface;

wherein the customized interface is presented to the remote user, the customized interface including a customized plurality of communications options for the remote user to route subsequent communications, wherein the customized interface comprises customized content that is customized based on a context of the natural language inquiry, and wherein a customized plurality of predefined inquiries is changed based on the remote user selecting a customized communications option.

18. The tangible non-transitory computer-readable storage medium of claim 17,
wherein the analyzing of the natural language inquiry by the analysis server includes matching individual keywords and patterns of keywords by an algorithmic model to probable topics according to likelihood.

19. A system, comprising:
an application server configured to receive a contact request by a remote user over a network, and transmit a predefined interface in response to the received contact request;

a remote computing device configured to receive the predefined interface that was transmitted by a transmitter at the application server to the remote user computing device over the network, in response to a contact request by the remote user;

a presenter configured to present the received predefined interface to the remote user, by displaying the predefined interface on the remote user computing device, the predefined interface being customized by the application server based on specified conditions including a location of the remote user computing device, a time of day, a day of a week that the contact request is received by the server, and a type of remote user language in which the contact request is received by the application server;

a receiver, at the application server, configured to receive a natural language inquiry from the remote user via the predefined interface;

an analysis server in communication with the application server by a communication link different from the network, configured to analyze the natural language inquiry based on the type of remote user language of the content request from the remote user, wherein the transmitter at the application server is configured to transmit a customized interface to the remote user computing device, wherein the presenter is configured to present the customized interface to the remote user, the customized interface including a customized plurality of communications options for the remote user to route subsequent communications, wherein the customized interface comprises customized content that is customized based on a context of the natural language inquiry, and wherein a customized plurality of predefined inquiries is changed based on the remote user selecting a customized communications option.

20. The system of claim 19, wherein the analyzing of the natural language inquiry by the analysis server includes matching individual keywords and patterns of keywords by an algorithmic model to probable topics according to likelihood.

* * * * *